Nov. 18, 1958 P. J. DANCIK 2,860,711
CONTROL SYSTEM FOR TANDEM HELICOPTER
Filed April 19, 1955 4 Sheets-Sheet 1

INVENTOR.
Paul J. Dancik

INVENTOR.
Paul J. Dancik.

INVENTOR.
Paul J. Dancik.

United States Patent Office 2,860,711
Patented Nov. 18, 1958

2,860,711

CONTROL SYSTEM FOR TANDEM HELICOPTER

Paul Julius Dancik, Media, Pa., assignor to Vertol Aircraft Corporation, a corporation of Pennsylvania Application April 19, 1955, Serial No. 502,456

9 Claims. (Cl. 170—135.22)

This invention relates generally to helicopters of the type supported by two or more rotors arranged in tandem upon the fuselage. These helicopters are controlled in speed or direction by changing the angle of attack of the several blades either simultaneously or selectively, throughout all or part of the circular path described by the blades. This invention in particular relates to control means for effecting any desired change in the angle of attack of the rotor blades.

The rotor blades are the principal means whereby changes in altitude, speed, or direction may be made, said blades ordinarily describing a conical path when rotated under flight conditions about the rotor axis. When the axis of the cone is vertical the thrust of the rotor is vertical and when tilted in any direction there results a horizontal thrust vector in that direction, the value of which increases as the angle of attack of the blades is increased. In this invention the actual rotor axis is maintained fixed relative to the fuselage and the actual axes of the rotors are the axes of the rotor shafts, and the axes of the cones of rotation of the rotor blades are known as the virtual axes of the rotors. The virtual axes are tilted by a cyclic variation of the angles of attack of the individual blades.

In this invention the mechanism for changing the angle of attack of the rotor blades comprises a swash plate which surrounds the rotor shaft and is movable longitudinally of the shaft and is tiltable in any direction relative to the axis of the shaft. Tilting of the swash plate produces a cyclic change in the angle of attack of the blades and axial movement produces a collective pitch change of all the blades. This invention is specifically concerned with means for effecting tilting and raising or lowering motion of the several swash plates.

The principal object resides in providing improved control means incorporating linkages operable with a swash plate to tilt the virtual axis of the rotor and to increase and decrease the thrust of the rotor.

Another object is to provide differential linkage whereby the cyclic pitch control means will remain unchanged when the total pitch control means is changed.

Another object of the invention is to provide manually operable mechanism including cables for changing the angle of attack of the rotor blades of a helicopter throughout any portion of the path described by their rotation.

Another object is to provide control means for helicopters which will accomplish the above stated object by permitting the pilot to tilt or move the swash plate axially relative to the rotor shaft in a rotor assembly.

Another object of this invention is the provision of control means including cables for tandem helicopters by which the pilot may alter the position of the swash plates of both rotor assemblies simultaneously and in the same or opposite directions.

Another object of this invention is the provision of control means for tandem rotor helicopters incorporating means actuated by a single control member to control cyclically the pitch of the blades of both rotors in the same or opposite sense, to the same extent or differentially.

The foregoing and other features and advantages will appear in the following description and the appended drawings, wherein for illustration a preferred embodiment of the invention is shown.

The terms used herein are defined as follows: "Cyclic pitch" denotes a progressive change in the angle of attack of any rotor blade from a maximum value at one point in its circular path to a lower value at a point 180° away and back again to its maximum value, the cycle being completed with each revolution of the blades. "Forward cyclic pitch" denotes an increase in pitch angles of the retreating blades and a decrease in pitch angles of the advancing blades of the rotors. "Longitudinal cyclic pitch control action" is intended to designate the application of simultaneous changes in the cyclic pitch of both rotors in the same sense forwardly or rearwardly. "Collective pitch" denotes the average angle of attack of all blades of one rotor at any instant, and is not changed by superimposing cyclic pitch. "Differential collective pitch" denotes a difference in the collective pitch between the two rotors of a tandem rotor helicopter giving one rotor a greater thrust than the other, resulting in a moment about the pitch axis of the aircraft. The term "fore and aft mean differential pitch control action" is intended to designate the application of simultaneous and unequal or opposite changes in the mean, total or collective pitch of the forward and aft rotors. "Differential cyclic pitch" denotes the tilting of the swash plates to tilt the lift vectors of the rotors in relatively opposite directions.

Figure 1:
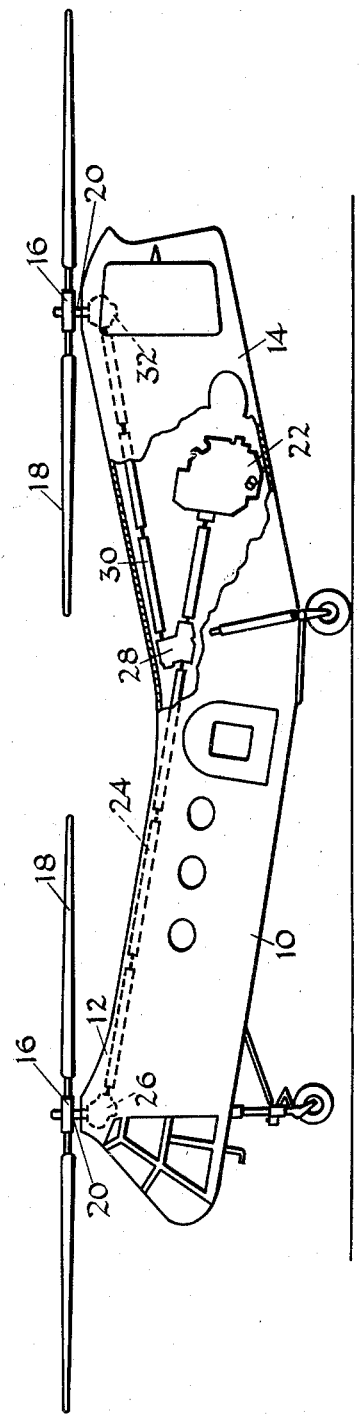
Figure 1 shows a side elevation of a tandem rotored helicopter in hovering position with part of the fuselage structure broken away to illustrate the drive system.

Referring to Fig. 1, there is shown a tandem rotor helicopter comprising a fuselage indicated generally as 10 having a forward portion 12 and an aft portion 14. A rotor hub assembly 16 having blades 18 is mounted upon the forward portion 12 and aft portion 14 substantially at the end thereof. The blades 18 are joined to the rotor hubs 16 by means of a linking connection but may be rigidly connected if desired. The rotor shafts 20 are fixed in the fuselage so that their axes are substantially parallel to each other. A power plant 22 drives the rotors in opposite directions, the power being transmitted to the forward rotor by a drive shaft 24 and gear reduction unit 26, and to the aft rotor by a gear box 28, a drive shaft 30, and a gear reduction unit 32. Associated with each rotor 16 is a swash plate assembly 34 (Figs. 3 and 4) which cooperate to control the pitch or angle of attack of the blades.

Figure 3:
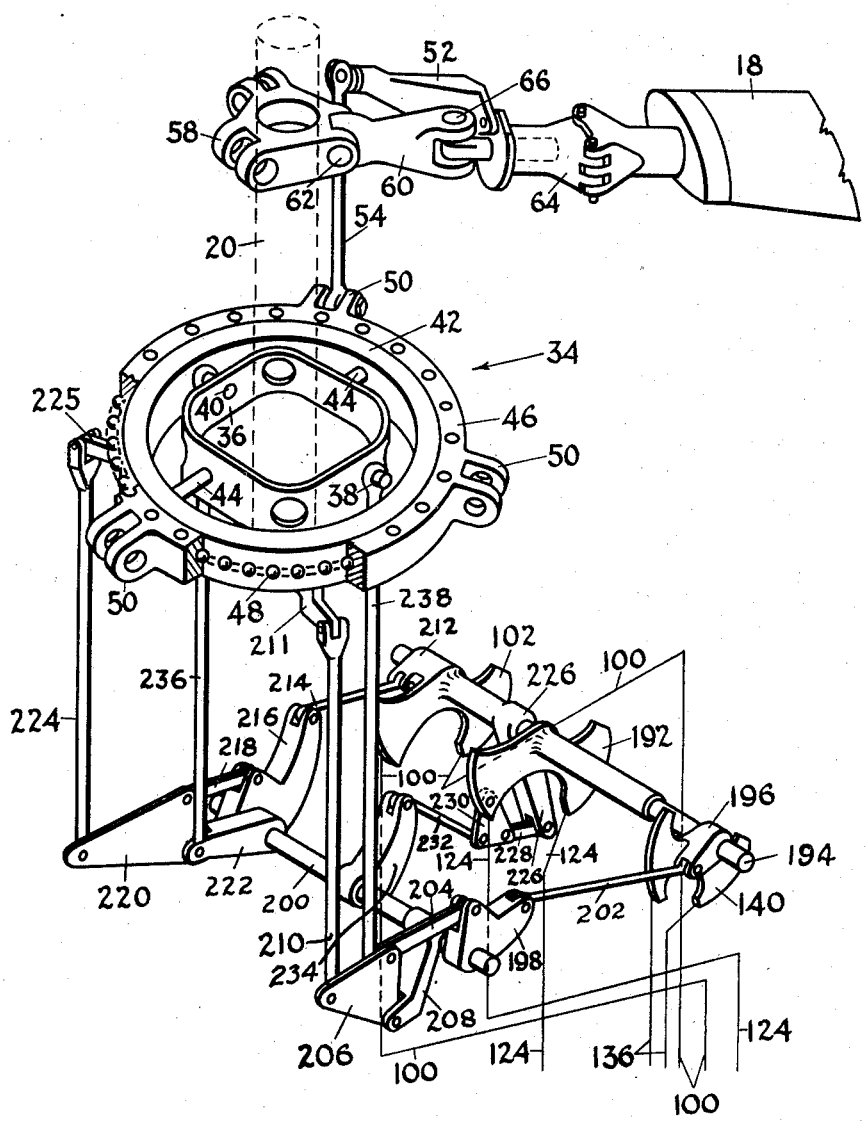
Figure 3 is an isometric view of the forward swash plate assembly and rotor controls.
Figure 4:
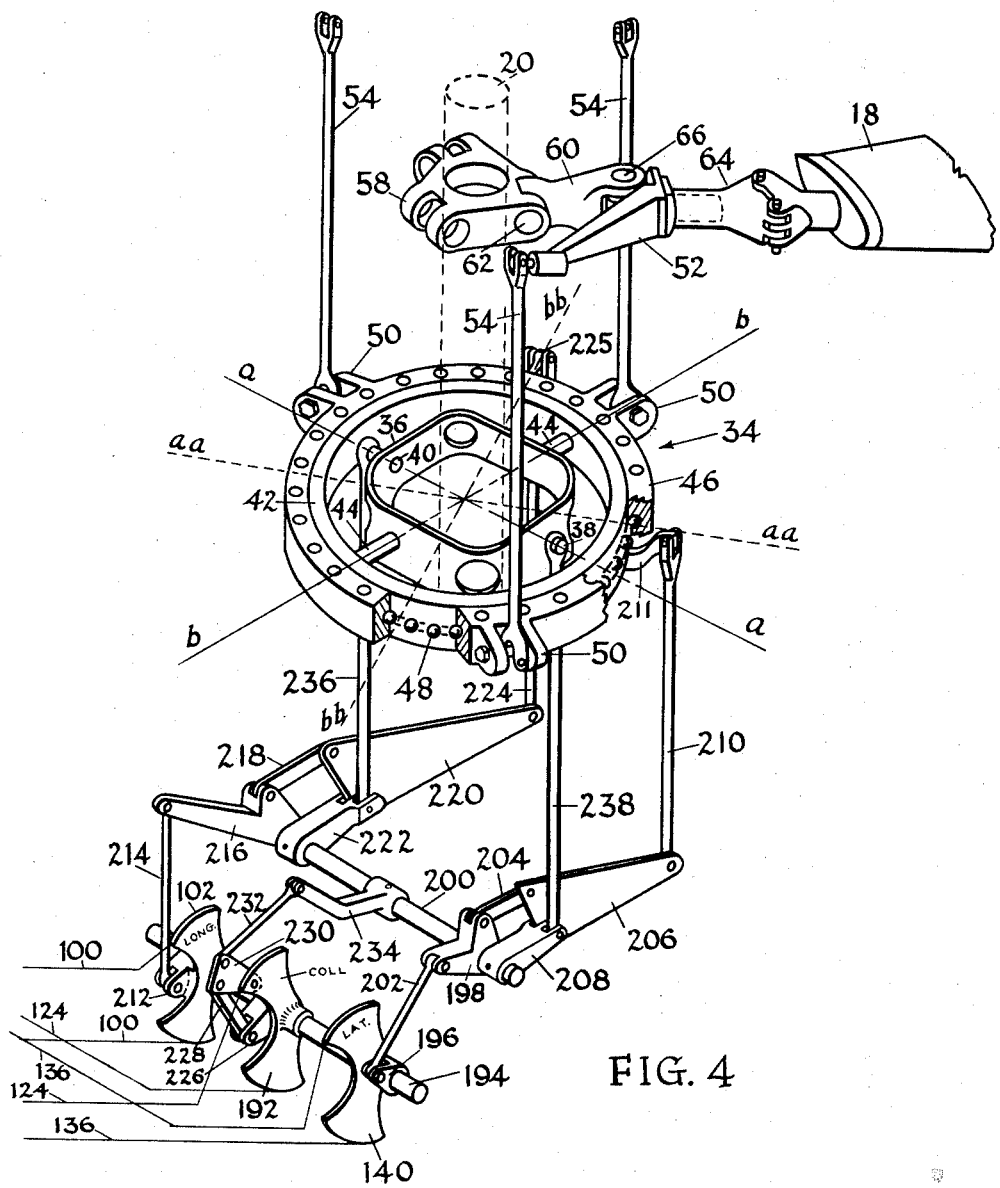
Figure 4 is an isometric view of the aft swash plate assembly and rotor controls.

The functional and mechanical relationship between the rotor shaft, the rotor blades and swash plate assembly is essentially the same for both rotors and like parts in Figs. 3 and 4 bear the same numerals. It will be seen that the swash plates are at the termini of the controls where they are coupled with the several rotor blades to regulate the pitch thereof at all points in the path described by them.

Each of the swash plates comprises a gimbal ring 36 pivotaly mounted for rotation about a substantially transverse axis a—a (Fig. 4) upon supports 38 and 40 which in turn are supported by a member of the upper flight control assembly in a manner which will be described more fully hereinafter. A middle ring 42 concentric with the gimbal ring 36 when the rings are in the same plane, is pivotally attached to the gimbal ring for rotation about substantially a fore and aft axis b—b by means of trunnions 44. The gimbaled joint so formed permits the ring 42 to be tilted in any direction any desired amount within the limits of the joint. An outer ring 46 is mounted outside of ring 42, said rings being maintained in permanent concentric relation but are movable with respect to each other about their common axis, ball bearings 48 being positioned at the interface of the rings to minimize friction between them. The outer ring is provided with a number of lugs 50, to which the root ends of the rotor blades 18 are coupled by a pitch horn 52 and a link 54. Further, any tilting of the outer ring 46 is accompanied by a corresponding rotation of the rotor blades about their pitching axes as the blades and ring rotate together under the influence of the rotor shaft 20 which rotates within the gimbal ring 36. The blades 18 are joined to and rotated by shaft 20 being connected thereto by means of hub 58, and a flapping link 60 is pivoted to said hub by means of horizontal pin connection 62. A drag link 64 is pivoted to said flapping link by means of a vertical pivot connection 66. Blade 18 is mounted on said drag link for pitch change about its longitudinal axis by means of a suitable bearing connection. Pitch arm 52 is mounted on blade 18 to move said blade about said longitudinal axis. The extremity of pitch arm 52 is shown coincident with the axis of the aforementioned horizontal pin connection 62 such that when the blade is subjected to flapping forces, movement of said blade will not introduce a pitch change in the blade. For other pitch settings of the blade, since the extremity of pitch arm 52 would not then be coincident with pin connection 62, flapping movement of the blade will introduce a slight pitch change in the blade. The rotor shaft 20 is positioned for rotation within the gimbal 36, with sufficient clearance being allowed to permit universal tilting of the swash plate.

The general arrangement of the components of the flight controls consists of the cockpit controls, lower differential controls, and upper forward and aft controls.

Figure 2:
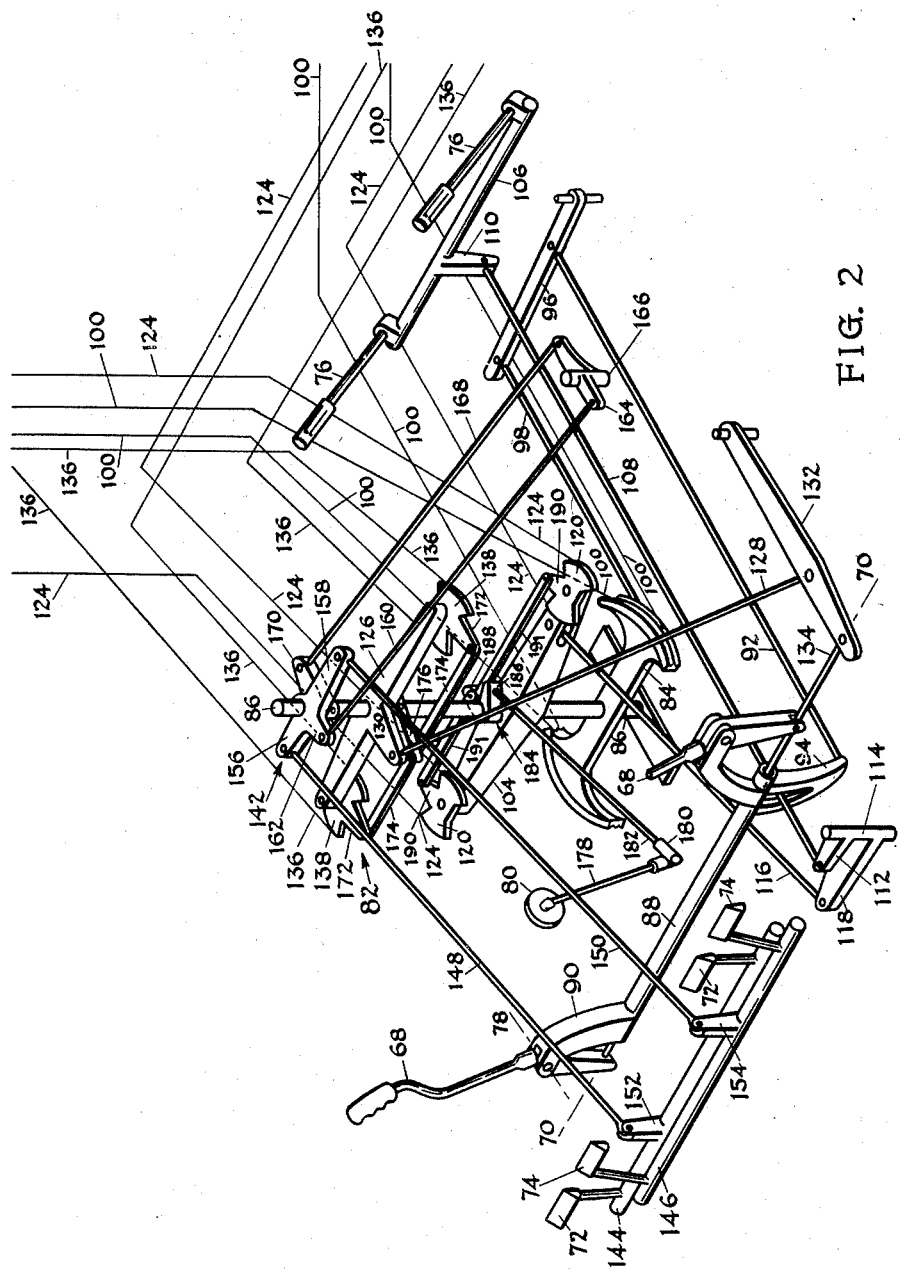
Figure 2 is an isometric view of the lower cockpit controls assembly.

The cockpit controls, referring to Fig. 2, consists of dual attitude control sticks 68, one of which is only partially shown, and dual adjustable foot pedal controls 72 and 74, located in the conventional position. Dual collective pitch control levers 76 and trim control 80 are located in a convenient position beside the pilot.

The lower differential control assembly 82 is a combination of bell cranks and quadrants which coordinate and transmit the movement of the cockpit controls by means of cables to the forward and aft upper flight control assemblies which in turn transmit the movement to the forward and aft rotors. There are five separate controls in the system operating either independently or in conjunction with one another; they are longitudinal, collective pitch, longitudinal trim, lateral and directional controls.

Separating the lower differential control assembly 82 and upper flight control assemblies into their various control functions, their description is as follows:

The longitudinal control linkage of the lower differential control assembly 82 includes the quadrant 84 which is rotatably mounted upon shaft 86 which in turn is vertically mounted to fuselage structure by means of suitable bearings for rotation about its longitudinal axis. Quadrant 84 is actuated by fore and aft movement of control stick 68 and associated linkages connected to quadrant 84. Cyclic stick 68 is mounted to control stick torque tube 88 which is rotatable about a lateral axis 70 and is also mounted for lateral motion about a fore and aft pivot axis 78 by means of extension 90 projecting from tube 88. Link 92 connects arm 94 which extends from a lower extremity of torque tube 88 to idler 96 which is pin-connected to fuselage structure. Link 98 connects the extremity of idler 96 to longitudinal quadrant 84. Four longitudinal cables 100 are clamped to the outer circumferential ends (two at each end) of quadrant 84 and transmit motion from it to the longitudinal quadrants 102 (Figs. 3 and 4) of the fore and aft upper flight controls to tilt both swash plates fore or aft in a manner to be hereinafter described.

The collective pitch control linkage of the lower differential control assembly 82 includes a walking beam 104 rotatably mounted on shaft 86 just above quadrant 84. It is actuated for movement about the axis of shaft 86 by up and down movement of collective pitch stick 76 which is fixed to torque tube 106. Rod 108 connects arm 110 projecting beneath said tube to a first arm 112 of collective pitch idler 114. Link 116 connects the second arm 118 of said idler to an extremity of collective pitch walking beam 104. Trim control quadrants 120 are pivoted on each end of collective pitch walking beam 104. Two collective pitch cables 124 are attached at their ends to the circumference of each of the two trim control quadrants 120 and are attached at their other ends to collective pitch quadrants 192 (Figs. 3 and 4). Up and down rotational movement of collective pitch stick 76 is transmitted by collective pitch walking beam 104, associated linkages and said cables to the upper flight controls to raise and lower both swash plates in a manner to be described in further detail hereinafter.

The lateral control linkage of the lower differential control assembly 82 includes a walking beam 126 rotatably mounted on shaft 86 above collective pitch walking beam 104. It is actuated by a push pull tube 128 attached at one end of an arm projecting from walking beam 126 and the other end of tube 128 is connected along the length of lateral idler 132. The aft end of idler 132 is pivotally mounted to fuselage structure and its forward end is connected to cyclic stick 68 by laterally moving link 134. Two lateral cables 136 are attached at their one ends to the circumference of each of two butterfly quadrants 138 and at their other ends to lateral quadrants 140 (Figs. 3 and 4) in the upper control system. Each butterfly quadrant 138 is pivoted at its center on the ends of walking beam 126. Walking beam 126 is operated by the aforementioned linkage from the lateral positioning of the cyclic stick 68 and causes the walking beam to rotate about shaft 86. The lateral cables 136, attached to said quadrants, transmit this motion to the upper flight controls to tilt both swash plates to the right or left.

The directional control linkage of the lower differential control assembly 82 includes a directional control bell crank 142 rotatably mounted on the top of shaft 86. Directional control foot pedals are secured to the tops of pedal posts 72 and 74 which are fixedly attached to torque tubes 144 and 146 respectively. Push-pull tubes 148 and 150 connect arms 152 and 154 projecting from said torque tubes to the ends of the laterally disposed arms 156 and 158 of bell crank 142. Rod 160 connects the third arm 162 integral with and projecting in a fore and aft direction from bell crank 142 to the forward extremity of directional control idler 164 which is pivotally mounted to fuselage structure as at 166. Rod 168 connects the aft end of idler 164 to the aft-wise extending arm 170 which is integral with shaft 86. Previously mentioned butterfly quadrants 138 each have arms 172 respectively connected to each other by links 174, and to a third arm 176 integral with and projecting forwardly from shaft 86. Motion of the rudder pedals 72 and 74 through the above described mechanism imparts a differential movement to the lateral cables 136 so that the swash plate of one rotor tilts to the right while the swash plate of the other rotor tilts to the left.

The trim control linkage of the lower differential control assembly is incorporated as part of the collective pitch control mechanism. It includes a trim wheel 80 which rotates a torque tube 178 connected to a linear actuator 180. This actuator converts the rotary motion of torque tube to a linear motion of rod 182. Rod 182 is connected to laterally extending arm 186 of bell crank 184 which is rotatably mounted on shaft 86. Arm 188 extending aft from bell crank 184 is connected to arms 190 of butterfly or trim control quadrants 120 by means of links 191. Movement of trim wheel imparts a differential movement of the collective pitch quadrants 192 (Figs. 3 and 4) of the upper controls through the above mechanism so that the collective pitch of one rotor is increased while the collective pitch of the other is decreased.

The forward and aft upper controls (Figs. 3 and 4) provide a means by which the forces exerted on the control cables are transferred to the forward and aft hub controls. The upper controls are divided into lateral, longitudinal, and collective pitch, each having a quadrant 140, 102, 192 respectively to which their respective cables are attached. The three quadrants operate on a common shaft 194 which is disposed in a substantially horizontal plane and its axis lies at approximately right angles to the centerline of the aircraft.

The lateral control quadrant 140 and control arm 196 integral therewith is ball bearing mounted and free to rotate on shaft 194. The end of said control arm 196 is fastened by link 202 to a horizontally disposed arm of bell crank 198 which rotates about a torque tube 200 disposed in parallel relationship with shaft 194. This bell crank 198 has a vertical control arm which projects from the top of its hub. A short link 204 connects the upper control arm of said bell crank to a point on the upper corner of a short lateral differential bell crank 206 having its lower pivot point attached to the end of collective pitch arm 208 pin connected to tube 200 for rotation therewith and the extremity of said differential bell crank being attached to the lower end of link 210. The upper end of link 210 is connected to arm 211 integral with non-rotating ring 42 of said swash plate. Thus actuation of lateral quadrant 140 by means of cables 136 is accompanied by a tilting of the swash plates 34 and rotation of the rotor blades about their pitching axis.

The longitudinal control quadrant 102 and integral control arm 212 is likewise ball bearing mounted on shaft 194. The end of arm 212 by means of rod 214 is fastened to one arm of bell crank 216 which rotates about tube 200. Link 218 connects the other arm of bell crank 216 to the upper corner of elongated longitudinal differential bell crank 220 having its lower pivot point attached to a second collective pitch arm 222 pinned to tube 200. The outer pivot point of said bell crank 220 is connected to arm 225 integral with swash plate ring 42 by means of connecting link 224. In the same manner as in the case of actuation of lateral quadrant 140, rotation of longitudinal quadrant 102 by means of cables 100 is accompanied by a tilting of the swash plate 34 at right angles to that induced in the case of the lateral quadrant 140 to result in a pitch change of the rotor blades.

Formed as an integral part of a tubular extension of quadrant 102 is a crank 226 as best shown in Fig. 3. A link 228 connects crank 226 with one corner of a triangular bell crank member 230. The second corner of the triangular member 230 is pivotally attached to quadrant 192. The third corner of the triangular member 230 is linked to the collective pitch arm 234 by means of link 232 to permit simultaneous application of collective pitch with longitudinal cyclic.

Considering the operation of the swash plate in closer detail, it is seen that the gimbal ring 36 is supported and moved longitudinally of rotor shaft 20 by collective pitch links 236 and 238. The links are pin-connected to said gimbal ring in such a manner that the ring can tilt about a horizontal laterally disposed axis $a$—$a$. In addition, gimbal ring 36 by means of trunnions 44 is mounted so that the non-rotating inner race 42 of swash plate 34 can tilt about the axis $b$—$b$ of trunnions 44 which is parallel with the longitudinal axis of the aircraft. Lateral pitch link 210 and longitudinal pitch link 224 are pin-connected to non-rotating race 42 of said swash plate and are displaced 90° in azimuth from each other and are in addition offset from the true mechanical axes $a$—$a$ and $b$—$b$ of gimbal ring 36 and non-rotating ring 42. Upon movement of lateral control link 210, for example, the lateral virtual axis of tilt of the swash plate is about axis $bb$—$bb$ which passes through the axis of rotation of shaft 20 and the connection of longitudinal link 224 with arm 225 integral with inner non-rotating ring 42. This follows because the connections between the gimbal ring 36 and ring 42 constitutes a universal joint whose effective center coincides with the rotational center of the rotor shaft 20. Since collective pitch links 236 and 238 do not move, this center is maintained fixed. The connection between link 224 and arm 225 integral with non-rotating ring 42 is also maintained fixed inasmuch as link 224 is not moved in lateral control. Consequently, a line extending from the point of intersection of the mechanical axes $a$—$a$ and $b$—$b$ of gimbal ring 36 and the point of connection between arm 225 and control link 224 defines the virtual axis of tilt $bb$—$bb$ about which the swash plate is inclined to obtain lateral control. In the same manner it follows that the longitudinal virtual axis of tilt $aa$—$aa$ is defined as a line extending from the intersection of the mechanical axes $a$—$a$ and $b$—$b$ of gimbal 36 and the point of connection between lateral arm 211 integral with ring 42 and lateral link 210. Thus it is seen that when lateral or longitudinal cyclic control is applied the virtual axes of tilt $aa$—$aa$, and $bb$—$bb$ of the swash plate for said control are angularly removed from the mechanical axes $a$—$a$, and $b$—$b$ of gimbal 36 and ring 42.

The degree of angular displacement of said virtual axes from said mechanical axes can in this system be varied by changing the transverse distances between arms 222 and 208 and bell cranks 220 and 206 and connecting links and by varying the respective lengths of the fore and aft disposed differential bell cranks 220 and 206.

The collective pitch quadrant 192 is mounted to rotate about shaft 194. Quadrant 192 is connected to collective pitch arm 234 by member 230 and link 232 as afore described. Arm 234 is pinned to tube 200. Collective pitch links 236 and 238 connect the ends of collective pitch arms 222 and 208 respectively to gimbal ring 36. Thus, rotation of the collective pitch quadrant 192 causes member 230 to rotate about the point where it is connected to link 228 held fixed by the lateral control system and rocks arm 234 to actuate all four links—236, 238, 224 and 210—to move the swash plate 34 longitudinally of rotor shaft 20. Link 218 is equal in length and parallel to arms 222, similarly link 204 is equal in length and parallel to arm 208 to form a parallelogram relationship. Rocking of collective pitch arm 234 rotates arms 222 and 208 to cause links 236, 238, 224 and 210 to move an equal amount vertically simultaneously.

*Operation*

In discussing the operation of the mechanical parts of my invention, it is assumed that the controls described above are incorporated in a helicopter of the type shown in Fig. 1 and that the aircraft is in steady flight and at constant altitude with the pitch setting of the blades also constant. To obtain vertical motion of the aircraft it is necessary for the pilot to increase or decrease the pitch setting of the blades. The pilot does this by pulling back on collective pitch lever 76. This motion rotates collective pitch walking beam 104 about shaft 86 by linkage connecting said lever to said walking beam. Collective pitch cables 124, which are attached to the outer end of each quadrant 120, transmit this motion to rotate quadrant 192 of the upper flight controls. This train of movement passes through bell crank 230, push-pull rod 232 and to arm 234. Movement of said arm causes torque tube 200 to rotate which in turn causes the two arms 222 and 208 which are also pinned to tube 200 to rotate. Links 236 and 238 connect these arms to the gimbal ring 36 and the transmitted movement causes the swash plate 34 to raise or lower and to change the collective pitch of the blades. To prevent the swash plates from tilting laterally or longitudinally, links 224 and 210 are attached to longitudinal differential bell crank 220 and lateral differential bell crank 206 respectively in such a manner to raise or lower the swash plate 34 the same amount as the collective pitch links 236 and 238. It is thus seen that by following the motion of the collective pitch stick through the various members of the articulated coupling the swash plates are made to raise or lower, thereby increasing or decreasing the collective pitch of both rotors by an equal amount to change the altitude of the helicopter.

The pilot may cause the helicopter to move laterally by moving cyclic stick 68 laterally in the desired direction. Lateral movement of stick 68 by linkage connecting said stick to walking beam 130 causes said walking beam to rotate on shaft 86. Two lateral cables 136 which are attached to the outer ends of each of two quadrants 138 attached to the outboard ends of said walking beam transmit this motion to rotate quadrants 140 of the upper flight controls. This train of movement passes through push rod 202 to rotate lateral bell crank 198 and from it through link 204 to rotate the lateral differential bell crank 206. This bell crank is connected to the rotor control ring 42 by link 210 and the transmitted movement causes the swash plates to tilt to the right or left to cyclically change the pitch setting of the rotor blades.

Directional control of the helicopter may be affected by applying differential cyclic pitch of the rotors so that the cones of rotation are tilted in opposite lateral directions, due to rudder control. This is accomplished by the pilot depressing one of the rudder pedals 72 or 74. The directional control bell crank 142 includes arms 156, 158 and 162 which are all integral. Arms 156 and 158 are operated by interconnecting linkage 148 and 150 from the rudder pedals. The directional bell crank 142 is connected directly to the pedals by push rods 148 and 150 and rotates about shaft 86. This motion is transmitted through the idler linkage 160, 164 and 168 to the arm 170 pinned to shaft 86. Rotation of arm 170 thus causes shaft 86 to rotate and transmits this motion to arm 176 also pinned to shaft 86. This differential lower arm 176 connects to the two lateral quadrants 138 by means of links 174 and the motion causes the quadrants 138 to rotate about their shafts in the outboard ends of the lateral walking beam 130. This motion imparts a differential movement to lateral cables 136 to rotate the lateral quadrants 140 (Figs. 3 and 4) in opposite directions. The train of movement passes through the lateral push rod 202 to the lateral bell crank 198 and from it through link 204 to the lateral bell crank 206. This bell crank is connected to the rotor control swash plate by link 210 and the transmitted movement causes ones wash plate to tilt to the right and the other to the left. The lateral thrusts of the two rotors are thus made opposite, by virtue of any lateral cyclic pitch introduced by the rudder pedal movement which causes the helicopter to rotate about a vertical axis.

Forward or rearward motion of the helicopter is effected by forward or rearward motion of cyclic stick 68. Motion of cyclic stick 68 is transmitted to both swash plates equally, the effect being to tilt them forwardly or rearwardly. Thus for longitudinal control the quadrant 84 of the differential assembly 82 is operated by linkage 94, 92, 96, 98 from the longitudinal position of the cyclic stick 68 causing quadrant 84 to rotate about shaft 86. Four longitudinal cables 100 which are attached to its outer ends rotate longitudinal quadrant 102 and the train of movement passes through longitudinal push rod 214 to longitudinal bell crank 216, through link 218 and from it to the longitudinal bell crank 220. This bell crank is connected to the rotor control swash plate 34 by link 224 and the transmitted movement causes the swash plate to tilt forward or aft to create forward or rearward flight. In addition, the movement of the longitudinal quadrant 102 is transmitted to the collective pitch control through crank 226 integral therewith, link 228, bell crank 230, link 232 and arm 234. Rotation of arm 234 causes links 236, 238, 224 and 210 to move vertically as before described. This movement causes a change in the collective pitch at the same time the longitudinal cyclic pitch is changed. This differential arrangement causes the collective pitch of one rotor to increase while the collective pitch of the other rotor decreases. Assuming that the control stick is moved forward for forward flight, not only are both swash plates tilted forwardly but since crank 226 at the same time displaces collective pitch push rod 228, differential bell crank 230, push rod 232 and collective pitch arm 234, the collective pitch of the forward rotor is decreased while that of the aft rotor is correspondingly increased. Thus the helicopter assumes the proper forward flight attitude in response to movement by the pilot of a single manual control. When this flight attitude is reached, the pilot brings the control column to substantially neutral position and may further regulate his forward speed by collective pitch changes in both rotors.

Where the pilot desires to maintain differential collective pitch between the rotors, as where there is an uneven load distribution about the center of gravity of the helicopter, he may do so by manipulating control wheel 80. This lengthens or shortens link 182 through the operation of actuator 180 and rotates bell crank 184 until the proper differential collective pitch is obtained.

It will be understood that the foregoing description is only illustrative of my invention and that modifications may be made therein without departing from the spirit of the invention.

What is claimed is:

1. In a helicopter, in combination, a fuselage, a rotor carried by each end portion of said fuselage, said rotors each comprising a rotatable shaft and a plurality of airfoil blades coupled to said shaft and rotatable therewith, a swash plate associated with each of said rotors and movable longitudinally of and tiltable in any direction with respect to said shaft, the blades of said rotors being connected to the respective swash plates and rotatable about their substantially longitudinal axes in response to changes in position of the swash plate relative to said shaft, said blades of each rotor when rotated defining a cone of rotation about said shaft, the axis of said cone being angularly related to said rotor axis when cyclic pitch changes are applied to said blades, said swash plates being related to the blades of their respective rotors to change the collective pitch thereof upon movement of said swash plates longitudinally of said shafts and to impart a cyclic pitch change to said blades upon tilting motion of said swash plates to tilt the respective axes of said cones in the same direction, a control column universally supported in the helicopter for oscillation longitudinally and transversely thereof, an upper control assembly associated with each of said swash plates, each of said control assemblies including a shaft and a torque tube mounted to the fuselage, a quadrant carried by said shaft, an arm carried by said torque tube, a differential bell crank carried by said arm and connected to its respective swash plate, a bell crank mounted on said torque tube and connected to said quadrant and to said differential bell crank, and an articulated coupling connecting said quadrant of each of said assemblies to said control column, whereby movement of said control column in a fore and aft direction rotates said swash plates an equal amount in the same direction about their generally transverse axes.

2. A helicopter in accordance with claim 1 wherein said shaft and torque tube of said control assembly are disposed at right angles to the longitudinal axis of the aircraft.

3. In a helicopter, in combination, a fuselage, a rotor carried by each end portion of said fuselage, said rotors each comprising a rotatable shaft and a plurality of airfoil blades coupled to said shaft and rotatable therewith, a swash plate associated with each of said rotors and movable longitudinally of and tiltable in any direction with respect to said shaft, the blades of said rotors being connected to the respective swash plates and rotatable about their substantially longitudinal axes in response to changes in position of the swash plate relative to said shaft, said blades of each rotor when rotated defining a cone of rotation about said shaft, the axis of said cone being angularly related to said rotor axis when cyclic pitch changes are applied to said blades, said swash plates being related to the blades of their respective rotors to change the collective pitch thereof upon movement of said swash plates longitudinally of said shafts and to impart a cyclic pitch change to said blades upon tilting motion of said swash plates to tilt the respective axes of said cones in the same direction, a control column universally supported in the helicopter for oscillation longitudinally and transversely thereof, an upper control assembly associated with each of said swash plates, each of said control assemblies including a shaft and a torque tube mounted to the fuselage, first and second quadrants carried by said shaft, a pair of arms carried by said torque tube, a differential bell crank carried by each of said arms and connected to the respective swash plates, first and second bell cranks mounted on said torque tube and each connected to one of said first and second quadrants and to one of said differential bell cranks, and an articulated coupling connecting said first and second quadrants to said control column, whereby movement of said control column in a fore and aft direction rotates said swash plates an equal amount in the same direction about substantially transverse axes, and movement of said control column in a lateral direction rotates said swash plates in the same direction about substantially fore and aft axes.

4. In a helicopter, in combination, a fuselage, a rotor carried by each end portion of said fuselage, said rotors each comprising a rotatable shaft and a plurality of airfoil blades coupled to said shaft and rotatable therewith, a swash plate associated with each of said rotors and movable longitudinally of and tiltable in any direction with respect to said shaft, the blades of said rotors being connected to the respective swash plates and rotatable about their substantially longitudinal axes in response to changes in position of the swash plate relative to said shaft, said blades of each rotor when rotated defining a cone of rotation about said shaft, the axis of said cone being angularly related to said rotor axis when cyclic pitch changes are applied to said blades, said swash plates being related to the blades of their respective rotors to change the collective pitch thereof upon movement of said swash plates longitudinally of said shafts and to impart a cyclic pitch change to said blades upon tilting motion of said swash plates to tilt the respective axes of said cones in the same direction, a control column supported in the helicopter for fore and aft displacement, a control assembly associated with each of said swash plates, each of said control assemblies including a shaft and a torque tube mounted to the fuselage, a quadrant carried by said shaft, a pair of arms carried by said torque tube, a differential bell crank carried by each of said arms, said arms and said differential bell cranks each being connected to the respective swash plates, means connecting said quadrant to said torque tube for rocking said arms, and means connected to said differential bell cranks to prevent the swash plates from tilting, whereby movement of said control column in a fore and aft direction raises and lowers said swash plates.

5. In a helicopter, in combination, a fuselage, a rotor carried by each end portion of said fuselage, said rotors each comprising a rotatable shaft and a plurality of airfoil blades coupled to said shaft and rotatable therewith, a swash plate associated with each of said rotors and movable longitudinally of and tiltable in any direction with respect to said shaft, the blades of said rotors being connected to the respective swash plates and rotatable about their substantially longitudinal axes in response to changes in position of the swash plate relative to said shaft, said blades of each rotor when rotated defining a cone of rotation about said shaft, the axis of said cone being angularly related to said rotor axis when cyclic pitch changes are applied to said blades, said swash plates being related to the blades of their respective rotors to change the collective pitch thereof upon movement of said swash plates longitudinally of said shafts and to impart a cyclic pitch change to said blades upon tilting motion of said swash plates to tilt the respective axes of said cones in the same and opposite directions, a control column universally supported in the helicopter for oscillation longitudinally and transversely thereof, an upper control assembly associated with each of said swash plates, each of said control assemblies including a shaft and a torque tube mounted to the fuselage, first and second quadrants carried by said shaft, a pair of arms carried by said torque tube, a differential bell crank carried by each of said arms and connected to the respective swash plates, first and second bell cranks mounted on said torque tube and each connected to one of said first and second quadrants and to one of said differential bell cranks, an articulated coupling connecting said first and second quadrants to said control column, whereby movement of said control column in a fore and aft direction rotates said swash plates an equal amount in the same direction about substantially transverse axes, and movement of said control column in a lateral direction rotates said swash plates in the same direction about substantially fore and aft axes, and pedal means operatively connected to said articulated coupling to rotate said swash plates an equal amount in opposite directions about substantially fore and aft axes, whereby a turning movement and a force for lateral translation of said helicopter may be simultaneously applied to said helicopter.

6. In a helicopter, in combination, a fuselage, a rotor carried by each end portion of said fuselage, said rotors each comprising a rotatable shaft and a plurality of airfoil blades coupled to said shaft and rotatable therewith, a swash plate associated with each of said rotors and movable longitudinally of and tiltable in any direction with respect to said shaft, the blades of said rotors being connected to the respective swash plates and rotatable about their substantially longitudinal axes in response to changes in position of the swash plate relative to said shaft, said blades of each rotor when rotated defining a cone of rotation about said shaft, the axis of said cone being angularly related to said rotor axis when cyclic pitch changes are applied to said blades, said swash plates being related to the blades of their respective rotors to change the collective pitch thereof upon movement of said swash plates longitudinally of said shafts and to impart a cyclic pitch change to said blades upon tilting motion of said swash plates to tilt the respective axes of said cones in the same direction, a control column supported in the helicopter for fore and aft displacement, a control column universally supported in the helicopter, a control assembly associated with each of said swash plates, said control assemblies each including a shaft and a torque tube mounted in the helicopter, first, second, and third quadrants mounted on said shaft, said first and third quadrants operatively connected to said universally supported control column and said second quadrant operatively connected to said other control column, first and second arms fixedly mounted on said torque tube, first and second differential bell cranks respectively carried by said first and second arms, said arms and said differential bell cranks each being connected to the respective swash plates, means connecting said first quadrant to said first differential bell crank, means connecting said third quadrant to said second differential bell crank, means connecting said second quadrant to said torque tube for rocking said arms, and means connecting said first quadrant to said torque tube connecting means whereby movement of said first quadrant by movement of said universally supported control column in a fore and aft direction tilts said swash plates equally in the same direction about substantially transverse axes and simultaneously moves said swash plates longitudinally of their respective rotor shafts an equal distance in opposite directions.

7. In a helicopter, a rotor carried by each end portion of said helicopter, said rotors each comprising a rotatable shaft and a plurality of airfoil blades coupled to said shaft and rotatable therewith, a swash plate associated with each of said rotors and movable longitudinally of and tiltable with respect to said shaft, the blades of said rotors being connected to the respective swash plates and rotatable about their substantially longitudinal axes in response to changes in position of the swash plate relative to said shaft, said swash plates being related to the blades of their respective rotors to change the collective pitch thereof upon movement of said swash plates longitudinally of said shafts and to impart a cyclic pitch change to said blades upon tilting motion of said swash plates, a control assembly associated with each of said swash plates, each of said control assemblies including a shaft and a torque tube mounted in the helicopter, first and second quadrants mounted on said shaft, a pair of arms fixedly mounted on said torque tube and operatively connected to the respective swash plate for moving said swash plate longitudinally of said shaft upon rotation of said torque tube, a differential bellcrank carried by one of said arms and operatively connected to said first quadrant and to its respective swash plate for tilting said swash plate upon movement of said first quadrant, means connecting said second quadrant to said torque tube for rotating said torque tube, and means connecting said first quadrant to said torque tube connecting means to rotate said torque tube in response to movement of said first quadrant to thereby move said swash plate longitudinally of its respective rotor shaft simultaneously with said tilting of said swash plate.

8. In a helicopter, a rotor carried by each end portion of said helicopter, said rotors each comprising a rotatable shaft and a plurality of airfoil blades coupled to said shaft and rotatable therewith, a swash plate associated with each of said rotors and movable longitudinally of and tiltable with respect to said shaft, the blades of said rotors being connected to the respective swash plates and rotatable about their substantially longitudinal axes in response to changes in position of the swash plate relative to said shaft, said swash plates being related to the blades of their respective rotors to change the collective pitch thereof upon movement of said swash plates longitudinally of said shafts and to impart a cyclic pitch change to said blades upon tilting motion of said swash plates, a control assembly associated with each of said swash plates, each of said control assemblies including a shaft mounted in the helicopter, first and second quadrant means mounted on said shaft, means connecting said second quadrant means to the respective swash plate for moving said swash plate longitudinally of its respective rotor shaft in response to movement of said second quadrant means and including a pair of arm members, means connecting said first quadrant means to the respective swash plate for tilting said swash plate about a substantially transverse axis in response to movement of said first quadrant means and including bellcrank means pivotally mounted on one of said arm members, and means connecting said first quadrant means to said first mentioned connecting means for moving said swash plate longitudinally of its respective rotor shaft in response to movement of said first quadrant means and simultaneously with said tilting movement of said swash plate.

9. The combination as set forth in claim 8, and including a control member supported in said helicopter, and means connecting said control member to each of said first quadrant means for simultaneously tilting said swash plates in the same general direction about substantially transverse axes in response to fore and aft movement of said control member, said third mentioned connecting means being so constructed and arranged to move said swash plates longitudinally of their respective rotor shafts in opposite directions simultaneously with said tilting movement.

References Cited in the file of this patent

UNITED STATES PATENTS

| 2,555,577 | Deland | June 5, 1951 |
| 2,663,371 | Magill | Dec. 22, 1953 |
| 2,670,804 | Campbell | Mar. 2, 1954 |